(12) United States Patent
Oljaca et al.

(10) Patent No.: US 9,152,270 B2
(45) Date of Patent: Oct. 6, 2015

(54) METHODS AND SYSTEMS FOR IMPROVING TOUCH SENSITIVITY OF TOUCH-BASED DEVICES

(75) Inventors: Miroslav Oljaca, Tucson, AZ (US); Srinivas K. Pulijala, Tucson, AZ (US)

(73) Assignee: STANDARD MICROSYSTEMS CORPORATION, Hauppauge, NY (US)

( * ) Notice: Subject to any disclaimer, the term of this patent is extended or adjusted under 35 U.S.C. 154(b) by 632 days.

(21) Appl. No.: 13/354,362

(22) Filed: Jan. 20, 2012

(65) Prior Publication Data

US 2013/0187895 A1 Jul. 25, 2013

(51) Int. Cl.
*G06F 3/041* (2006.01)

(52) U.S. Cl.
CPC .................................. *G06F 3/0416* (2013.01)

(58) Field of Classification Search
None
See application file for complete search history.

(56) References Cited

U.S. PATENT DOCUMENTS

| | | | | |
|---|---|---|---|---|
| 8,330,741 B1* | 12/2012 | Camarota | | 345/174 |
| 8,390,303 B2* | 3/2013 | Fang et al. | | 324/679 |
| 8,525,801 B2* | 9/2013 | Huang et al. | | 345/173 |
| 2005/0253836 A1* | 11/2005 | Kim et al. | | 345/212 |
| 2008/0007543 A1* | 1/2008 | D'souza | | 345/177 |
| 2008/0158198 A1* | 7/2008 | Elias | | 345/174 |
| 2009/0102813 A1* | 4/2009 | Mamba et al. | | 345/174 |
| 2009/0244029 A1* | 10/2009 | Huang et al. | | 345/174 |
| 2010/0164898 A1* | 7/2010 | Vu et al. | | 345/173 |
| 2011/0050634 A1* | 3/2011 | Lin et al. | | 345/174 |
| 2011/0109585 A1* | 5/2011 | Kwon et al. | | 345/174 |
| 2011/0115729 A1* | 5/2011 | Kremin et al. | | 345/173 |
| 2011/0157077 A1* | 6/2011 | Martin et al. | | 345/174 |
| 2011/0175847 A1* | 7/2011 | Wang et al. | | 345/174 |
| 2011/0210941 A1* | 9/2011 | Reynolds et al. | | 345/174 |
| 2011/0227870 A1* | 9/2011 | Kim | | 345/174 |
| 2011/0242049 A1* | 10/2011 | Kuang et al. | | 345/174 |
| 2011/0291986 A1* | 12/2011 | Rebeschi et al. | | 345/174 |
| 2012/0007813 A1* | 1/2012 | Chae et al. | | 345/173 |
| 2012/0062497 A1* | 3/2012 | Rebeschi et al. | | 345/174 |
| 2012/0062498 A1* | 3/2012 | Weaver et al. | | 345/174 |
| 2012/0105357 A1* | 5/2012 | Li et al. | | 345/174 |
| 2012/0112817 A1* | 5/2012 | Guedon et al. | | 327/517 |
| 2012/0194476 A1* | 8/2012 | Lee et al. | | 345/174 |
| 2012/0280945 A1* | 11/2012 | Shih et al. | | 345/178 |

FOREIGN PATENT DOCUMENTS

WO    WO 2011049285 A1 *   4/2011

* cited by examiner

*Primary Examiner* — Seokyun Moon
*Assistant Examiner* — Josemarie G Acha, III
(74) *Attorney, Agent, or Firm* — Slayden Grubert Beard PLLC (57) ABSTRACT

The present disclosure discloses methods and systems for improving touch detection of a touch screen device. The method includes determining touch coordinates when the touch screen device is touched. Subsequently, a sampling time is adjusted, depending on the touch coordinates relative to initial coordinates of the touch screen device.

13 Claims, 5 Drawing Sheets

Exemplary Circuit Diagram

METHODS AND SYSTEMS FOR IMPROVING TOUCH SENSITIVITY OF TOUCH-BASED DEVICES

TECHNICAL FIELD

The present disclosure relates generally to touch-based devices. More specifically, the present disclosure relates to touch sensitivity of such devices.

BACKGROUND

Touch screen technology has been in use since the early 1970s, but it has gained tremendous importance in recent years with the advent of cell phones and portable devices. Today, touch screen technology is widely used in electronic devices such as Personal Digital Assistants (PDAs), smart phones, Automated Teller Machines (ATMs), and kiosks. As known in the art, a touch screen is a visual display that detects a touch within a pre-defined area. Touch screens are typically sensitive to pressure, which can cause voltage.

A number of touch screen technologies are available on the market, such as resistive touch screens, capacitive touch screens, and surface wave touch screens. Of these, resistive touch screens are very popular because of their excellent durability, resolution, and other features. Resistive touch screens can detect touch applied by objects such as a finger or a stylus. A resistive touch screen includes an array of conductors in the x:y plane defining inherent capacitors. The touch screen can therefore be thought of as a matrix of resistors and capacitors (an RC matrix) having a varied RC value across the touch screen. This matrix extends across the touch screen to detect where a finger touches the screen. An output voltage of the touch screen varies with RC value, for instance, higher the RC value; smaller is the output voltage. Thus, when known voltage is applied at the end of the RC matrix, and when a finger touches the screen, a small voltage is detected. Thus, by sampling the signal at each location it is possible to determine whether, and where, the screen has been touched.

The touch screen includes a matrix of sensors distributed across the display in an x:y coordinate system. The system can sample each coordinate point, and any detected voltage or signal change can be used to identify a touch location. To elaborate, the touch sensor receives a touch input and subsequently detects voltage change and passes the voltage signal to a controller. Clearly, sampling time is related to the distance from the initial coordinate to the touch point, and as one moves further from the initial coordinate, sampling time increases.

Increased sample time for touch detection thus, presents a problem with touch screen devices. The industry has addressed this problem by increasing the resolution of the ADC with consequences of increased power consumption and increased chip IC area. This results in increased cost of the equivalent IC and increased power dissipation.

Thus, there remains a need to increase the response signal for a touch screen device. In view of this situation, the present disclosure proposes one or more ways for improving touch sensitivity of touch-based screens or devices.

SUMMARY

Briefly described, and according to one embodiment, the present disclosure discloses a method for improving touch detection of a touch screen device. The method includes determining touch coordinates when the touch screen device is touched. Subsequently, a sampling time is adjusted, depending on the touch coordinates relative to initial coordinates of the touch screen device.

In some embodiments, a method is disclosed for enhancing touch sensitivity of a touch-based device. The method includes identifying the location touched by a user on the touch-based device by sampling an input signal. The method further includes comparing the input signal with a reference voltage. Moreover, the method includes performing at least one of, based on the comparison: adjusting a sampling time by adjusting a conversion clock width or by adjusting a reference voltage by changing an input gain, depending on the distance of the touch location from the initial coordinates of the touch-based device. Finally, an output signal is generated.

Moreover, the present disclosure discloses a circuit interfacing with a touch screen to provide an improved touch sensitivity. The circuit includes an Analog-to-Digital Converter (ADC). The ADC determines touch coordinates when the touch screen is touched. Then, the ADC adjusts a sampling time, depending on the touch coordinates relative to initial coordinates of the touch device. The ADC also adjusts a reference voltage, depending on the touch coordinates relative to initial coordinates of the touch screen.

Additional embodiments of the disclosure propose a touch-based device facilitating an improved touch sensitivity. The touch-based device includes a sensor for receiving an input. The touch-based device further includes a processor for determining touch coordinates, based on the input. Further, the touch-based device includes an Analog-to-Digital Converter (ADC) performing at least one of: adjusting a sampling time by adjusting a conversion clock width, depending on touch location relative to the initial coordinates of the touch-based device or adjusting a reference voltage by changing an input gain at the ADC, depending on touch location relative to the initial coordinates of the touch-based device. Additionally, the touch-based device includes a display for displaying an output.

While embodiments of the present disclosure are amendable to various modifications and alternative forms, specific embodiments are shown by way of example in the drawings and are described in detail. It should be understood, however, that the drawings and detailed description thereto are not intended to limit the present disclosure to the particular form disclosed, but on the contrary, the intention is to cover all modifications, equivalents, and alternatives falling within the spirit and scope of the present disclosure as defined by the appended claims.

DETAILED DESCRIPTION

The following detailed description is made with reference to the figures. Embodiments are described to illustrate the disclosed system and method, not to limit their scope. With the insight provided by the instant disclosure, those of ordinary skill in the art should recognize a variety of equivalent variations on the description that follows.

Overview

The main aim of the present disclosure is to improve touch sensitivity of touch-based screens. Various types of touch screens may include resistive touch screens, capacitive touch screens and so forth. In general, a touch screen comprises a network of electrical elements, such as, capacitors, resistors, and the like. The touch screen can be seen as a two-dimensional matrix having "X" axes and "Y" axes, which acts as a sensor reading touch coordinates on a rectangular display. The device directly senses a voltage, which is fed to an analog-digital converter (ADC) to identify coordinates that specify the touched location.

Figure 1:
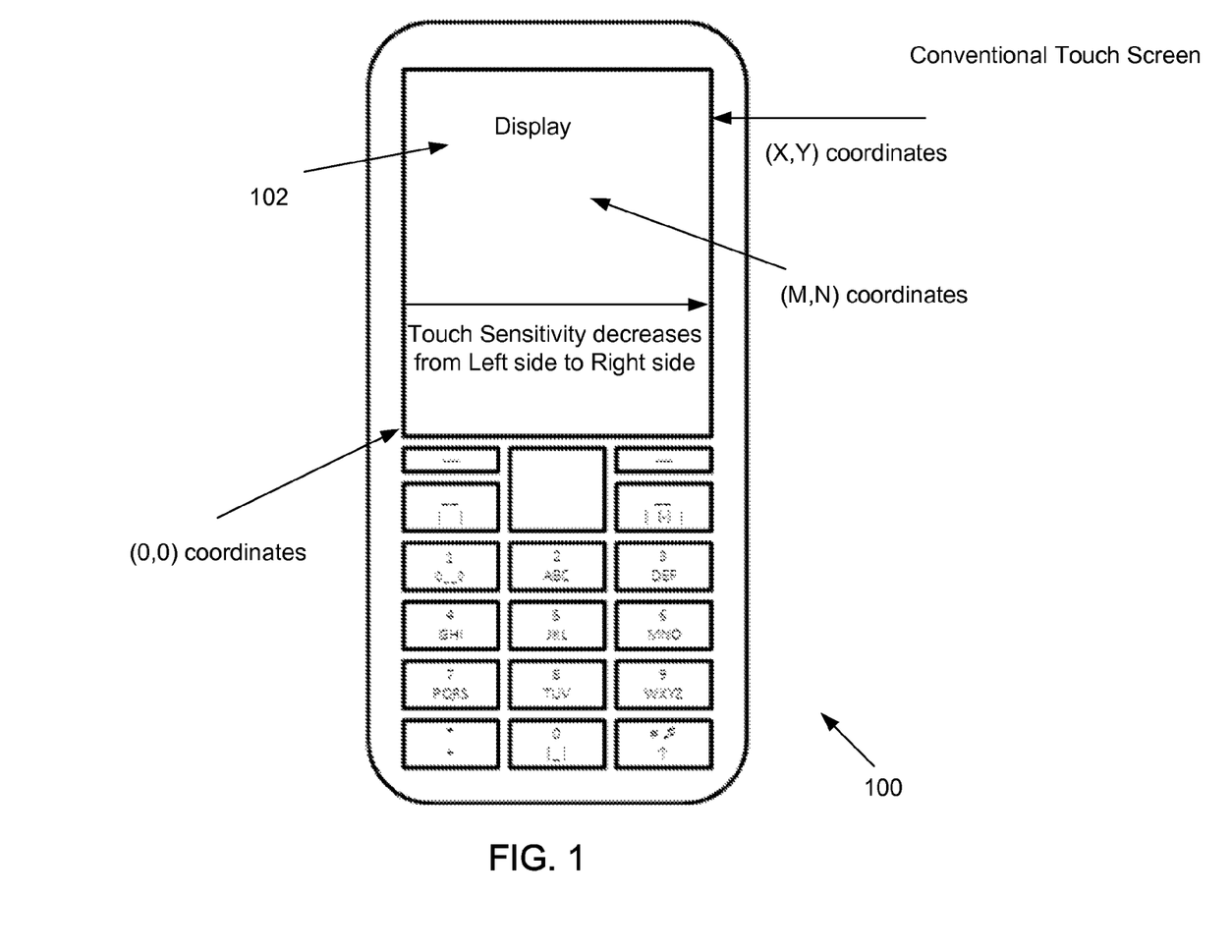
FIG. 1 depicts an illustrative conventional touch screen on an electronic device.

FIG. 1 shows a conventional touch screen device 100 with a display 102. As discussed above, the accumulated resistance of the screen increases as one moves across the touch screen further from the initial coordinates. The increase in equivalent resistance combines with equivalent parasitic capacitance of the touch screen to increase the time constant of the circuit, as follows:

$$V_{OUT}(t) = V_{CC} \cdot \left(1 - e^{-\frac{t}{\tau}}\right) \quad (1)$$

Figure 2:
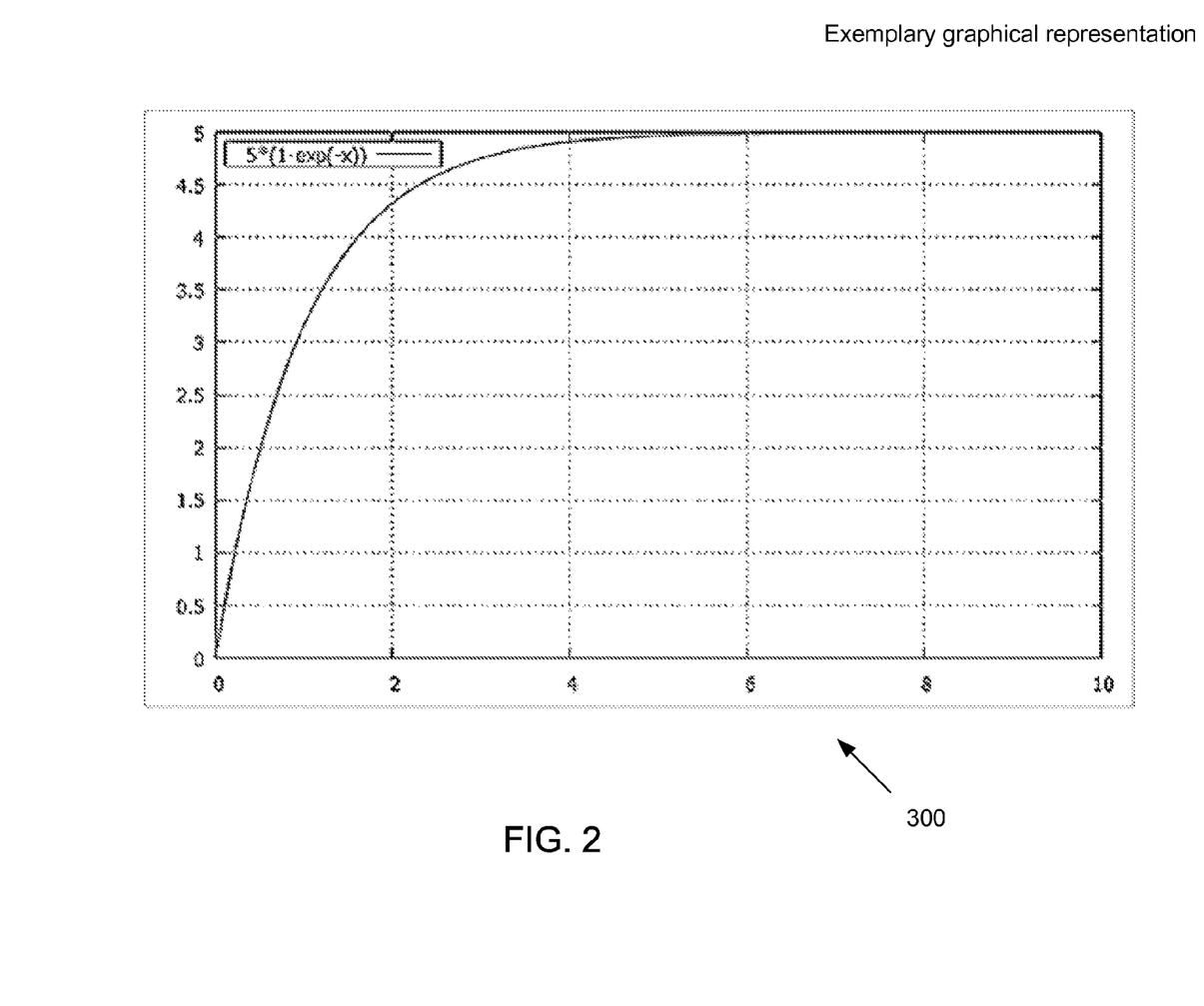
FIG. 2 is a graphical representation of typical signal settling time of a touch screen.

Where:

$V_{OUT}(t)$ is output voltage form touch screen,

Vcc is power supply voltage or voltage applied to the specific location column (x coordinate) of the touch screen, $\tau$ is the time constant of equivalent RC circuit The increased time constant compromises settling of the measurement signal and add additional delay as well as measurement error. If a constant sampling or acquisition time is used, the sampled voltage will vary in amplitude as a function of the time constant. This effect is illustrated in the graph of FIG. 2. In this figure, one can see the typical output signal $V_{OUT}(t)$ from the touch screen as a function of time, given a fixed time constant and the exponential relationship set out in Eq. 1. The x-axis indicates settling time, and the y-axis shows the distance from the (0, 0) location. Thus, as one moves further away from (0, 0), the settling time becomes exponentially longer.

Moreover, touch coordinates closest to the controller generally have less resistance and less capacitance. Signal response is therefore practically immediate at such locations, producing immediate touch detection. At touch coordinates further from the controller, both resistance capacitance increase, thereby increasing the RC value. As a result, the signal degrades and the signal response is 1-100 times longer than that at the closest coordinates.

The present disclosure varies the sampling/acquisition time depending on distance from the initial coordinates to longer. One method of the present disclosure compensates for this variation by extending the sampling time and allowing the output signal to settle to a predetermined level for locations further away from the initial coordinates. The circuit's time constant will continue to change, however, to the point where any additional increase in sampling time is not practical. Accordingly, a second method of the present disclosure alters the ADC full scale range (FSR) by changing the ADC's reference voltage gain.

Figure 3:
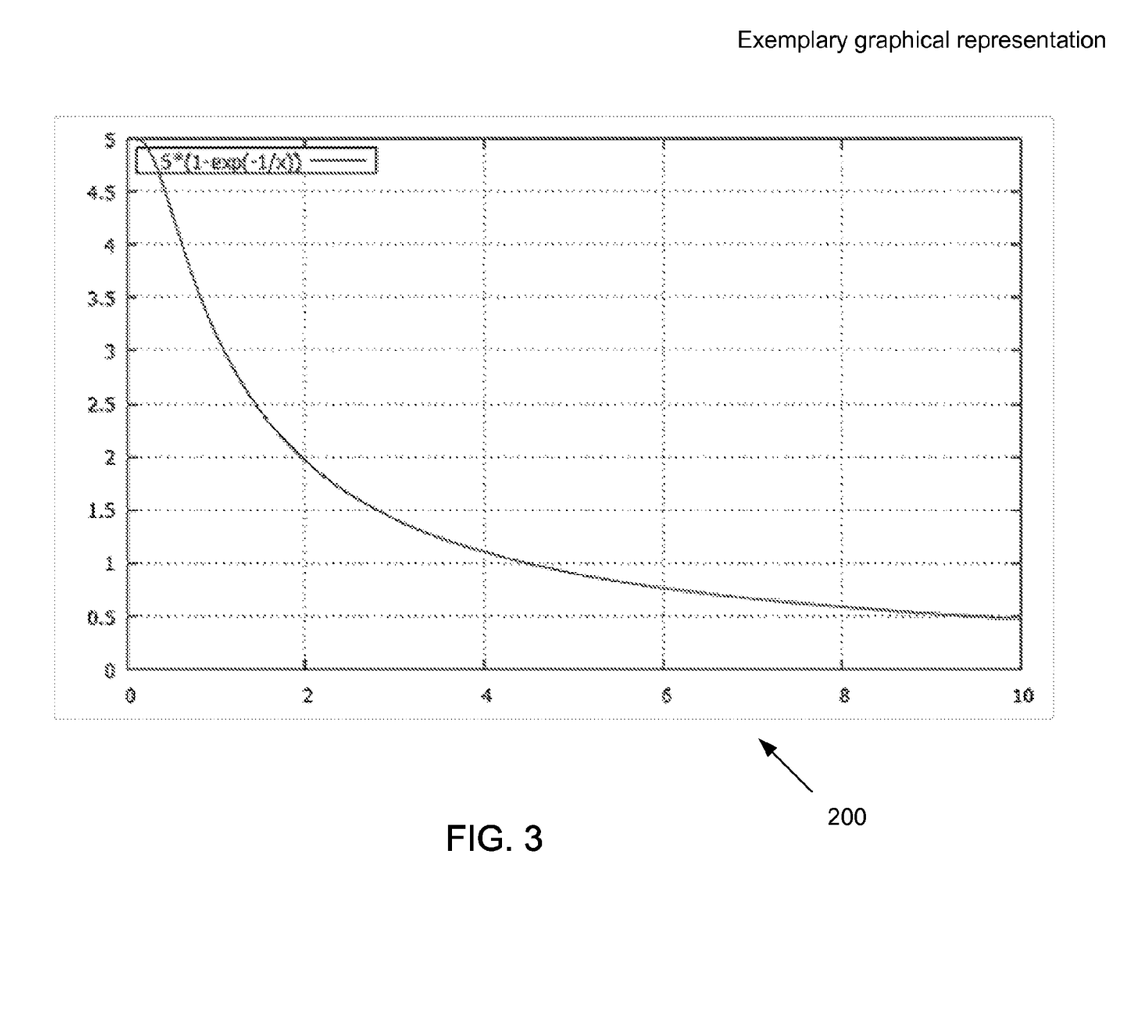
FIG. 3 is a graph of an output signal, according to an embodiment of the present disclosure.

FIG. 3 depicts the effect of the RC matrix defined by the touch screen. If the acquisition time is held constant, then the RC time constant varies with the screen touch location, and one can then deduce from the exponential function how output voltage from the touch screen changes as a function of RC, as shown. For a 10× change in RC (x-axis), the sampled output voltage from the touch screen will vary from about 5V to about 0.5V, i.e., by 10×. Unfortunately in a real application, the output RC constant of the touch screen can vary by as much as 100×. This will cause the output signal to vary by more than 100×, which will result in reduced noise sensitivity levels. In order to compensate for this phenomenon, the present disclosure increases the dynamic range of the ADC as one sample signals further from the (0, 0) location. In other words, the power supplied to the ADC is increased as one move further from the (0, 0) location. If, however, one were to rely purely on adjusting the dynamic range one would have to deal with increased power consumption and increased system cost.

The present disclosure therefore provides for a combination solution to address the problems described above. This solution is best understood with reference to FIG. 4.

Exemplary Circuit Diagram

Figure 4:
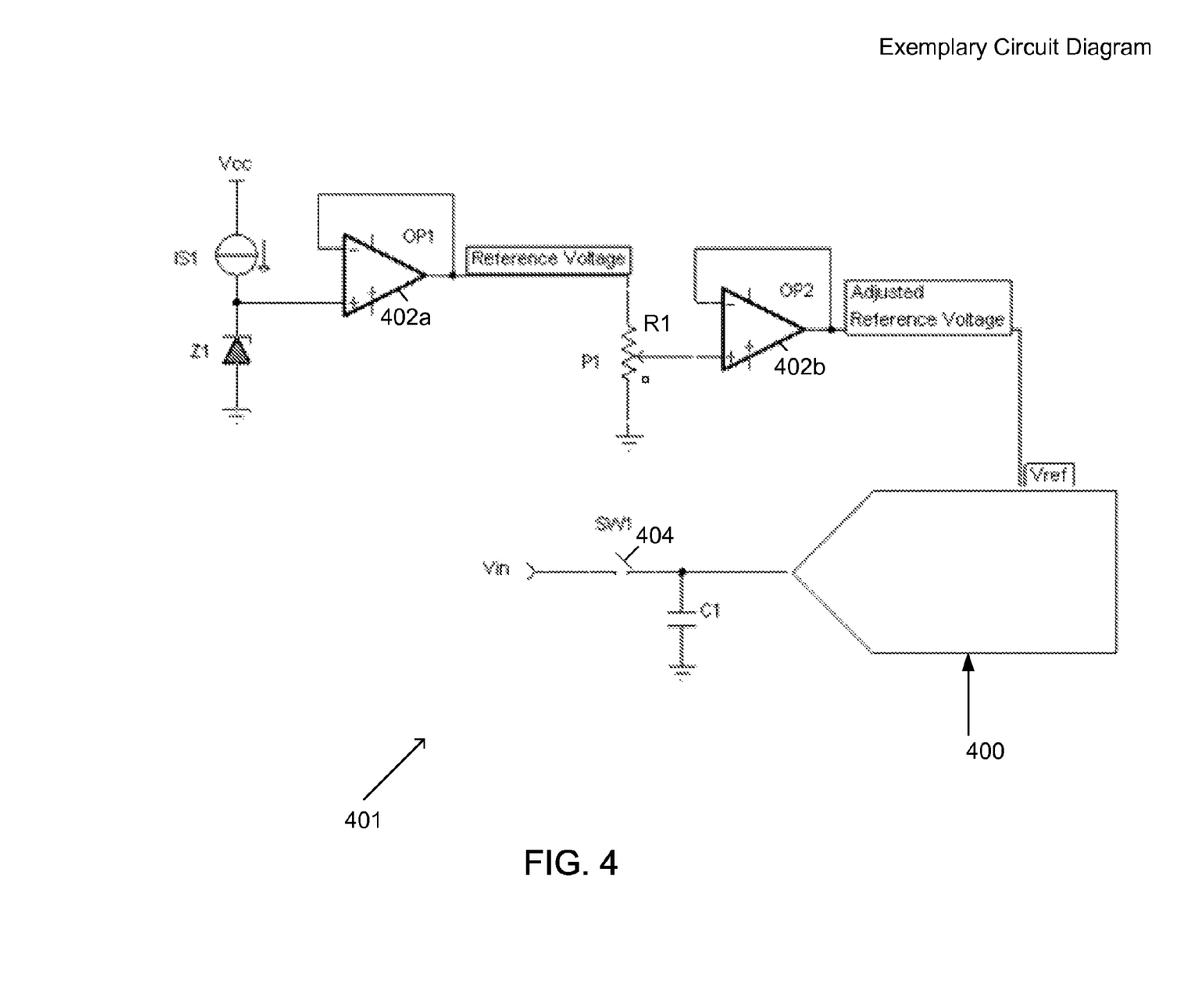
FIG. 4 demonstrates an exemplary circuit diagram for improving touch sensitivity of touch screens.

FIG. 4 discloses embodiment of the disclosure, comprising a circuit 401 that supports an Analog-to-Digital Converter (ADC) 400 employed in connection with a touch screen. This embodiment seeks to improve ADC sensitivity of a touch screen. Typically, the circuit 401 interfaces with a display and processes data when the touch screen is touched and further passes the data to a processing device (not shown) attached to an output of the ADC 400. In particular, the ADC converts the voltage created by the touch to a digital value. Subsequently, an event is interpreted and displayed on the display. More specifically, circuit 401 includes two Operational amplifiers 402a, 402b shown as OP1, OP2, and a switch 404 depicted as SW1.

In the standard circuit configuration, the ADC 400 samples input signal Vin with switch sw1 404 and charges the input sampling capacitor C1. The sampling time is constant irrespective of the level of the input voltage $V_{in}$. After sampling the input signal, switch sw1 404 opens, and the ADC conversion process starts. The ADC 400 then compares the sampled signal on capacitor C1 to the constant reference voltage $V_{ref}$ using the constant clock. Under conditions of constant sampling time, high input impedance, and low signal strength, an input signal lacks sufficient time to settle on capacitor C1. As a result, a portion of the information contained in the signal may be lost. By employing a constant conversion clock, conversion noise can be kept constant, especially at the Least Significant Bit (LSB) level, when comparing the sampled signal to $V_{ref}$. Accordingly, the last LSB clock cycle for the ADC 400 is extended, to provide more time for the comparator to settle and the noise to diminish. For the constant $V_{ref}$, the sampled signal is compared to a relatively high voltage $V_{ref}$, so that the resolution is constant. Using a variable $V_{ref}$, the resolution may be adjusted as a function of the expected input signal.

In detail, $V_{ref}$ is applied to the ADC, and the ADC 400 then determines touch coordinates when the touch screen device is touched. The ADC 400 samples one or more input signals $V_{in}$ received from the touch by a user. Then, the ADC 400 compares $V_{in}$ with $V_{ref}$. $V_{ref}$ defines the dynamic full scale input range of the ADC 400 and can be adjusted based on the touched location relative to initial coordinates of the touch screen device. The ADC 400 further controls the column or row of the touch screen to be sampled. Accordingly, the ADC 400 changes one or more pre-defined parameters, based on the $V_{in}/V_{ref}$ comparison. Examples of the parameters may include, but are not limited to, input gain, sampling time, conversion clock, and input scale range. Moreover, the ADC continuously runs the scan control to determine the coordinates of the point touched by the user.

In an embodiment, the reference voltage $V_{ref}$ may be adjusted with variable resistor R1 to reach a pre-determined level. In addition, the switch 404 allows the acquisition time or sampling time to be adjusted, based on the distance of the touch coordinates from the initial coordinates of the touch screen. As shown, P1 represents a potentiometer or variable resistor to set the ADC reference voltage, and R1 is a variable resistance. In one embodiment, $V_{ref}$ may have, 1.2× value.

In particular, the ADC 400 adjusts the dynamic reference voltage or Full Scale Range (FSR) as a function of touch coordinates. To do so, it adjusts the gain at the input of ADC 400 as a function of the touch screen co-ordinates. In another embodiment, the ADC 400 changes the sampling time. A longer sampling time at the far corner of the screen provides output at a predetermined voltage level. Lengthened sampling time results from adjusting the conversion clock width of the ADC 400, as a function of the touch screen co-ordinates, as is best understood with reference to the circuit diagram below. For example, the conversion clock at (0, 0) coordinates can be accelerated, and at far coordinates such as (X, Y), the conversion clock can be slowed.

In an embodiment, the parameters can be adjusted one at a time. Alternatively, the parameters may be adjusted in one or more combinations. In particular embodiments, parameters can be adjusted based on the type of touch screen. Knowing the RC combination at any point on the touch screen, one can adjust for variations across the screen by adjusting the $V_{ref}$ input to the ADC 400.

As can be seen, Equation 1, above, defines $V_{out}$ and $V_{cc}$ from the perspective of the touch screen. It will be appreciated that $V_{out}$ from the touch screen constitutes $V_{in}$ to the ADC. Similarly, $V_{cc}$ to the touch screen may be the input voltage to the touch screen. By providing a controllable $V_{ref}$, however, the reference voltage $Vr_{ef}$ to ADC is adjusted, depending on the location of the coordinate (x:y) relative to the (0,0) coordinate.

The parameter P1 (which defines the ADC Reference Voltage) and the acquisition time of switch SW1 are varied as a function of (x, y) co-ordinates of the touch screen. That combination takes account of the reduction in the signal magnitude and the delay in the signal (signal becomes a longer, lower exponential as one moves further from the x, y coordinate). To compensate, the system increases the ADC input gain along with the full scale range. At the same time, acquisition time is increased by slowing down the clock. The present disclosure therefore provides a combination solution to address the problem described above.

A longer acquisition time (sampling time) permits the output to settle to a pre-determined voltage level. That result stems from adjusting the conversion clock width of the ADC as a function of the touch screen co-ordinates.

The result of the present invention is:
Low Quiescent current;
Accurate and reliable touch detection.

Exemplary Method Flowchart

Figure 5:
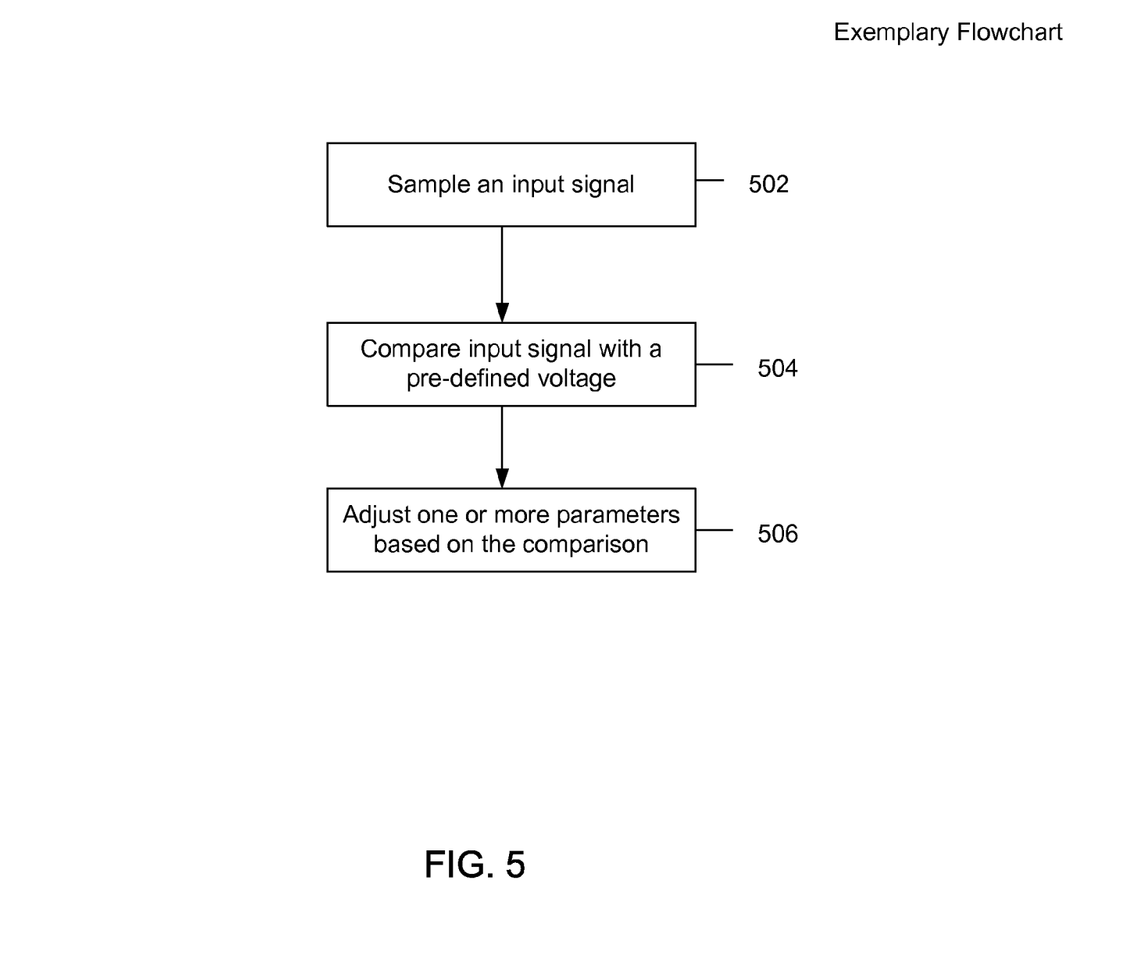
FIG. 5 is a method flow chart for improving touch-based sensitivity of touch devices, in an embodiment of the disclosure.

An embodiment of the process of the present disclosure appears in FIG. 5. This process aims to obtain a maximum signal sensing at any point on the touch screen. In particular, the disclosed process improves touch sensitivity In one embodiment, the method described here can be implemented using a circuit as shown in FIG. 4.

Initially, a pre-defined voltage is applied to the circuit. The pre-defined voltage is known as reference voltage and is denoted as $V_{ref}$. Afterward, an input voltage $V_{in}$ is received, corresponding to the touched coordinates. This signal is sampled at step 502, resulting in detection of corresponding touch coordinates. Thereafter, the input signal is compared with the pre-defined reference voltage at step 504. Based on the comparison, the touch sensitivity is controlled by adjusting one or more parameters (step 506), as discussed in detail above. Parameters may include, but are not limited to, sampling time and full scale input range, and those parameters are adjusted as a function of touch coordinates. This adjustment assists in reducing noise, providing improved touch sensitivity. Subsequently, an output voltage is generated and converted into a digital value used to identify the touch location.

In one embodiment, the sampling time can be adjusted as a function of exemplary touch screen coordinates of. For example, the farther one moves from initial coordinates, the more the sampling time is increased. It should be noted that sampling time, or acquisition time, can be defined by an Eq. 1, above. Usually, at initial coordinates such as (0, 0), signal detection is immediate and thus, the sampling time is low, which results in saving some amount of sampling time, compared to average values. In one embodiment, such saved time can be utilized to offset increased sample times when dealing with touch points at far end of the screen. In some embodiments, the input scale range may be adjusted as a function of touch coordinates.

Exemplary Application Areas

Touch screens as disclosed above can be used in various types of devices. A few examples of such devices include, but are not limited to, cell phones, laptops, Personal Digital Assistants (PDAs), and the like. One example of such devices is the model MEC8000 controller produced by Standard Micro Systems Corporation.

The present disclosure discloses methods and systems for improving touch sensitivity for touch-based devices. More particularly, the methods and systems focus on adjusting one or more parameters to improve the touch detection. Consequently, the signal response remains same at every point of the touch screen, be it left end of the screen or the right end corner of the screen. Further, signal degradation does not occur while moving across the screen. Furthermore, there is no delay when any point on the screen is touched. Therefore, the method and system facilitate accurate and reliable touch detection. Moreover, the methods and systems as disclosed require low quiescent current. Additionally, the methods and systems require less die area, thereby minimizing overall manufacturing cost of the integrated circuit. Over and above, the method and system of the disclosure requires less power consumption.

What is claimed is:

1. A method for improving touch detection of a resistive touch screen device, the method comprising:
    determining touch coordinates when the resistive touch screen device is touched, wherein touch coordinates are determined by measuring a voltage that has a settling time dependent on the touch coordinates relative to initial coordinates of the resistive touch screen device, wherein the voltage is provided by the resistive touch screen device as an input signal to an analog to digital converter, wherein the analog to digital converter comprises a sampling capacitor and further receives a reference voltage, wherein during conversion the reference voltage is compared to a voltage on the sampling capacitor; and
    adjusting a sampling time for the sampling capacitor depending on the touch coordinates relative to initial coordinates of the resistive touch screen device.

2. The method of claim 1, wherein adjusting the sampling time allows the voltage to reach to a predetermined level.

3. The method of claim 1, wherein the reference voltage is configurable, the method further comprising adjusting the reference voltage, depending on the touch coordinates away from the initial coordinates, to reach to a pre-determined level.

4. The method of claim 1, wherein an x coordinate is determined by a first conversion of a first voltage received from the resistive touch screen.

5. The method of claim 4, wherein a y coordinate is determined by a second conversion of a second voltage received from the resistive touch screen.

6. A method for enhancing touch sensitivity of a touch-based device, the method comprising:
- identifying a location touched by a user on the touch-based device comprising a resistive touch screen by sampling an input signal, wherein the input signal is a voltage that has a settling time dependent on the location;
- comparing the input signal with a reference voltage;
- performing at least one of, based on the comparison:
  - adjusting a sampling time by adjusting a conversion clock width,
  - depending on a distance of the touch location from initial coordinates of the touch-based device and generating an output signal; and
  - adjusting a reference voltage by changing an input gain, depending on the distance of the touch location from initial coordinates of the touch-based device and generating the output signal.

7. A circuit interfacing with a resistive touch screen to provide an improved touch sensitivity, the circuit comprising an Analog-to-Digital Converter (ADC) configured for: determining touch coordinates when the resistive touch screen is touched, wherein touch coordinates are determined by measuring a voltage that has a settling time dependent on the touch coordinates relative to initial coordinates of the resistive touch screen device, wherein the voltage is provided by the resistive touch screen device as an input signal to the analog to digital converter, wherein the analog to digital converter comprises a sampling capacitor and further receives a reference voltage, wherein during conversion the reference voltage is compared to a voltage on the sampling capacitor;
- wherein the circuit is configured to adjust a sampling time of the analog to digital converter depending on the touch coordinates relative to initial coordinates of the touch device and/or to adjust the reference voltage, depending on the touch coordinates relative to initial coordinates of the touch screen.

8. The circuit of claim 7, wherein the circuit is configured to determine an x coordinate by converting a first voltage received from the resistive touch screen.

9. The circuit of claim 7, wherein the circuit is configured to determine a y coordinate by converting a second voltage received from the resistive touch screen.

10. The circuit of claim 7 further comprising reference voltage source.

11. The circuit of claim 10 further comprising controllable trimmer coupled with the reference voltage source for adjusting the reference voltage.

12. The circuit of claim 7 further comprising a sampling switch coupled between the resistive touch screen and the sampling capacitor.

13. A touch-based device facilitating an improved touch sensitivity, the touch-based device comprising: a resistive touch screen sensor providing a first and a second voltage signal representing an x-coordinate and a y-coordinate, respectively, wherein the first and second voltage signals have a settling time dependent on the touch coordinates relative to initial coordinates of the resistive touch screen device;
- a processor configured to determine touch coordinates, based on the input;
- an Analog-to-Digital Converter (ADC) comprising a sampling capacitor configured to receive said first and second voltage signals, wherein the processor is configured to perform at least one of:
  - adjusting a sampling time of the ADC by adjusting a conversion clock width depending on touch location relative to the initial coordinates of the touch-based device; and
  - adjusting a reference voltage by changing an input gain at the ADC,
- depending on touch location relative to the initial coordinates of the touch-based device; and
- a display for displaying an output.

* * * * *

UNITED STATES PATENT AND TRADEMARK OFFICE
CERTIFICATE OF CORRECTION

PATENT NO.       : 9,152,270 B2  
APPLICATION NO.  : 13/354362  
DATED            : October 6, 2015  
INVENTOR(S)      : Miroslav Oljaca et al.

Page 1 of 1

It is certified that error appears in the above-identified patent and that said Letters Patent is hereby corrected as shown below:

In the claims

<u>Column 8,</u>
Claim 9, line 9, "…wherein the circuit is configured to determine ay coordinate…"
---Change to--- "…wherein the circuit is configured to determine y coordinate…"

Signed and Sealed this
Fifteenth Day of March, 2016

Michelle K. Lee
*Director of the United States Patent and Trademark Office*